(12) United States Patent
Murayama et al.

(10) Patent No.: US 10,305,531 B2
(45) Date of Patent: *May 28, 2019

(54) HF-BAND WIRELESS COMMUNICATION DEVICE

(71) Applicant: Murata Manufacturing Co., Ltd., Nagaokakyo-shi, Kyoto-fu (JP)

(72) Inventors: Hiromi Murayama, Nagaokakyo (JP); Yuya Dokai, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/485,490

(22) Filed: Apr. 12, 2017

(65) Prior Publication Data
US 2017/0220920 A1    Aug. 3, 2017

Related U.S. Application Data

(63) Continuation of application No. 14/560,280, filed on Dec. 4, 2014, now Pat. No. 9,634,714, which is a (Continued)

(30) Foreign Application Priority Data

Oct. 12, 2012 (JP) ................................. 2012-226491

(51) Int. Cl.
*H01Q 1/40* (2006.01)
*H04B 1/40* (2015.01)
(Continued)

(52) U.S. Cl.
CPC ......... *H04B 1/40* (2013.01); *G06K 19/07749* (2013.01); *G06K 19/07779* (2013.01);
(Continued)

(58) Field of Classification Search
CPC ....... G06K 19/07786; G06K 19/07779; H01Q 1/2225; H01Q 1/242; H01Q 7/00; H04B 1/40
(Continued)

(56) References Cited

U.S. PATENT DOCUMENTS 9,634,714 B2 *  4/2017  Murayama ............... H04B 1/40
2005/0212641 A1 *  9/2005  Hung .................... H01F 41/041
336/200

(Continued)

OTHER PUBLICATIONS

Murayama et al., "HF-Band Wireless Communication Device", U.S. Appl. No. 14/560,280, filed Dec. 4, 2014.

*Primary Examiner* — Ayodeji O Ayotunde
(74) *Attorney, Agent, or Firm* — Keating & Bennett, LLP

(57) ABSTRACT

A HF-band wireless communication device includes a wireless IC configured to process a radio signal, a first substrate including a first inductor pattern coupled to the wireless IC, and a second substrate which includes a coil-shaped second inductor pattern coupled in series to the first inductor pattern. An L value of the first inductor pattern is greater than an L value of the second inductor pattern, and the L value of the first inductor pattern is dominant in a resonant frequency of a resonance circuit including the first and second inductor patterns. A winding diameter of the second inductor pattern is greater than a winding diameter of the first inductor pattern, and the second inductor pattern defines a main radiating element.

17 Claims, 4 Drawing Sheets

Related U.S. Application Data continuation of application No. PCT/JP2013/077893, filed on Oct. 15, 2013.

(51) Int. Cl.
| | | |
|---|---|---|
| *H01Q 1/22* | (2006.01) | |
| *H01Q 7/00* | (2006.01) | |
| *G06K 19/077* | (2006.01) | |
| *H04B 1/3827* | (2015.01) | |
| *H01Q 1/24* | (2006.01) | |
| *H01Q 1/48* | (2006.01) | |

(52) U.S. Cl.
CPC . *G06K 19/07786* (2013.01); *G06K 19/07794* (2013.01); *H01Q 1/2225* (2013.01); *H01Q 1/242* (2013.01); *H01Q 1/40* (2013.01); *H01Q 1/48* (2013.01); *H01Q 7/00* (2013.01); *H04B 1/3827* (2013.01); *Y02D 70/00* (2018.01)

(58) Field of Classification Search
USPC .......................... 455/41.1, 73, 193.1, 193.2
See application file for complete search history.

(56) References Cited

U.S. PATENT DOCUMENTS

| | | | | |
|---|---|---|---|---|
| 2008/0122724 | A1* | 5/2008 | Kato | H01Q 1/243 343/867 |
| 2009/0262022 | A1* | 10/2009 | Ying | H01Q 1/243 343/700 MS |
| 2012/0049981 | A1* | 3/2012 | Fukunaga | H01P 1/20327 333/204 |
| 2012/0187944 | A1* | 7/2012 | Chao | G01R 33/0283 324/244 |
| 2012/0325915 | A1* | 12/2012 | Kato | H01Q 1/2225 235/492 |
| 2013/0092419 | A1* | 4/2013 | Tanaka | H01F 17/0013 174/250 |
| 2013/0234286 | A1* | 9/2013 | Nakashiba | H01L 23/522 257/531 |

* cited by examiner

HF-BAND WIRELESS COMMUNICATION DEVICE

This application is based on Japanese Patent Application No. 2012-226491 filed on Oct. 12, 2012 and PCT/JP2013/077893 filed on Oct. 15, 2013, the entire contents of each of which are incorporated herein by reference.

BACKGROUND OF THE INVENTION

1. Field of the Invention

The present invention relates to HF-band wireless communication devices and particularly to HF-band wireless communication devices preferably for use in an RFID (Radio Frequency Identification) system.

2. Description of the Related Art

In recent years, as an information management system for articles, the RFID system has been in practical use which establishes communication between a reader/writer for generating an induced magnetic field and an RFID tag (also referred to as "wireless communication device") attached to an article in a non-contact fashion with the use of an electromagnetic field in order to transmit predetermined information. The RFID tag contains the predetermined information and includes a wireless IC for processing predetermined radio signals and an antenna for carrying out transmission and reception of high frequency signals.

WO 2011/108341 discloses a HF-band RFID tag (wireless communication device) which includes a wireless IC for processing radio signals, a feeder circuit board on which the wireless IC is mounted, and a coil-shaped antenna pattern. In this device, a loop-shaped electrode which is coupled to the wireless IC is provided in the feeder circuit board. With only the loop-shaped electrode, the communication distance is short. However, the loop-shaped electrode is coupled to the antenna pattern via a magnetic field, and due to this feature, a long communication distance is achieved by utilizing the antenna pattern as a resonant booster.

In the wireless communication device, magnetic field coupling of a resonance circuit of the feeder circuit board and a resonance circuit of the coil-shaped antenna pattern is utilized, and therefore, power loss is likely to occur. Meanwhile, as for stabilization of the resonant frequency in the device, it is necessary to arrange the loop-shaped electrode and the antenna pattern with high accuracy. This is because the degree of coupling can vary depending on the arrangement relationship between these elements.

SUMMARY OF THE INVENTION

Preferred embodiments of the present invention provide a HF-band wireless communication device that significantly reduces or prevents power loss and stabilizes a resonant frequency while securing a required communication distance.

A HF-band wireless communication device according to a preferred embodiment of the present invention includes a wireless IC configured to process a radio signal; a first substrate which includes a first inductor pattern coupled to the wireless IC; and a second substrate which includes a coil-shaped second inductor pattern coupled in series to the first inductor pattern, wherein an L value of the first inductor pattern is greater than an L value of the second inductor pattern, and the L value of the first inductor pattern is dominant in a resonant frequency of a resonance circuit including the first and second inductor patterns, and a winding diameter of the second inductor pattern is greater than a winding diameter of the first inductor pattern, and the second inductor pattern defines and functions as a main radiating element.

In the HF-band wireless communication device, the resonant frequency is determined by the first and second inductor patterns and the capacitance of the wireless IC. Since the first inductor pattern that is coupled to the wireless IC and the second inductor pattern that defines and functions as a main radiating element are coupled in series, the power loss is small. In the resonant frequency of the device, the L value of the first inductor pattern is dominant so that the resonant frequency is stable. Further, since the second inductor pattern has a large winding diameter, the communication distance is long.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
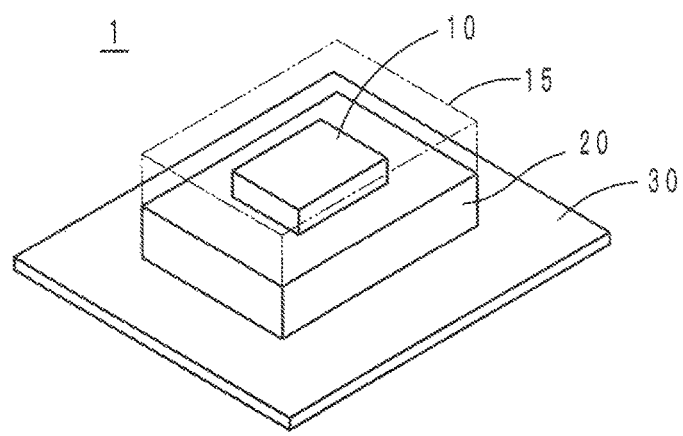
FIG. 1A is a perspective view of a wireless communication device which is a first example of a preferred embodiment of the present invention.
Figure 1B:
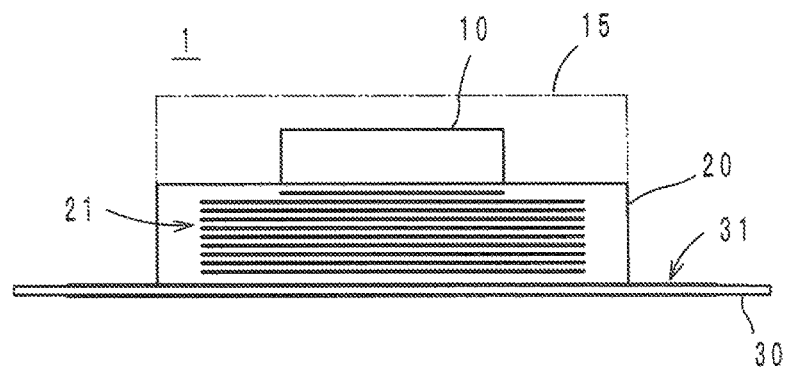
FIG. 1B is a schematic cross-sectional view of the wireless communication device of FIG. 1A.

Hereinafter, examples of a HF-band wireless communication device according to preferred embodiments of the present invention will be described with reference to the attached drawings. Note that common elements and parts are referred to using the same reference marks throughout the drawings, and the repetitive description is omitted.

A wireless communication device 1 that is the first example of a preferred embodiment of the present invention relates to a HF-band RFID system and includes a wireless IC 10 configured to process radio signals, a first substrate 20 which includes a first inductor pattern 21 coupled to the wireless IC 10, and a second substrate 30 which includes a second inductor pattern 31 coupled in series to the first inductor pattern 21 as shown in FIG. 1A, FIG. 1B, FIG. 2A, and FIG. 2B.

The wireless IC 10 is a semiconductor integrated circuit element which includes a clock circuit, a logic circuit, a memory circuit, etc., and in which necessary information is stored. The wireless IC 10 includes a pair of input/output terminal electrodes (not shown) on the rear surface. The terminal electrodes are coupled to one end of the first inductor pattern 21 and one end of the second inductor pattern 31 (see FIG. 2A and FIG. 2B). The wireless IC 10 preferably is overmolded with a resin material 15 on the first substrate 20.

Figure 3:
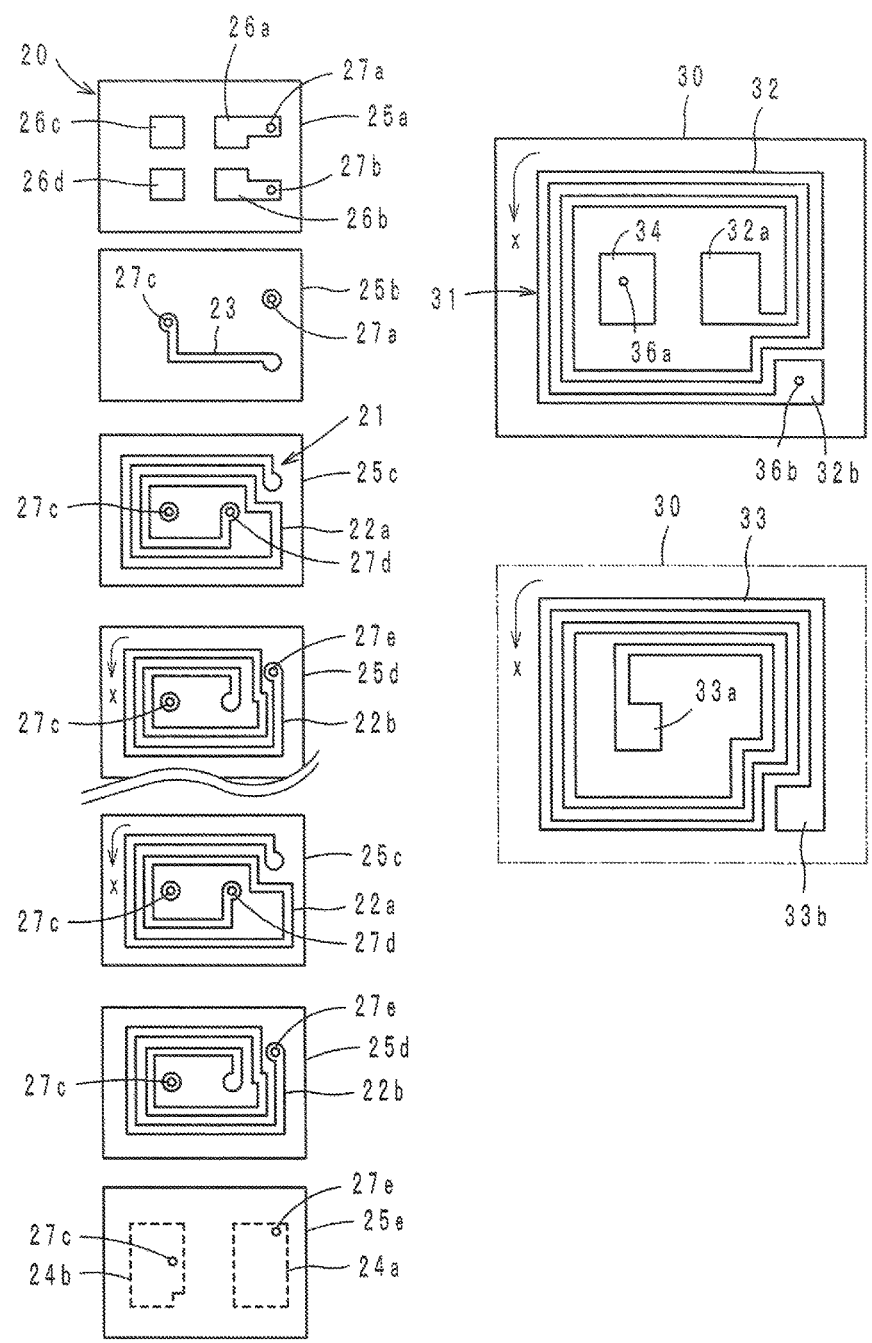
FIG. 3 is a plan view showing the first and second inductor patterns which define the wireless communication device of FIG. 1B.

The first inductor pattern 21 preferably is a coil which is realized preferably by stacking about 20 layers of conductor patterns 22a, 22b, for example, as shown in FIG. 3. The second inductor pattern 31 preferably is a coil which is realized by conductor patterns 32, 33 that are configured such that one layer is provided on each of the front and rear surfaces of the second substrate 30. The L value of the first inductor pattern 21 is greater than that of the second inductor pattern 31. For example, the L value of the first inductor pattern 21 preferably is about 1.32 µH, and the L value of the second inductor pattern 31 preferably is about 0.12 µH. The first and second inductor patterns 21, 32 and the capacitance of the wireless IC 10 define a resonance circuit and, in the resonant frequency of that circuit, the L value of the first inductor pattern 21 is dominant.

Figure 2A:
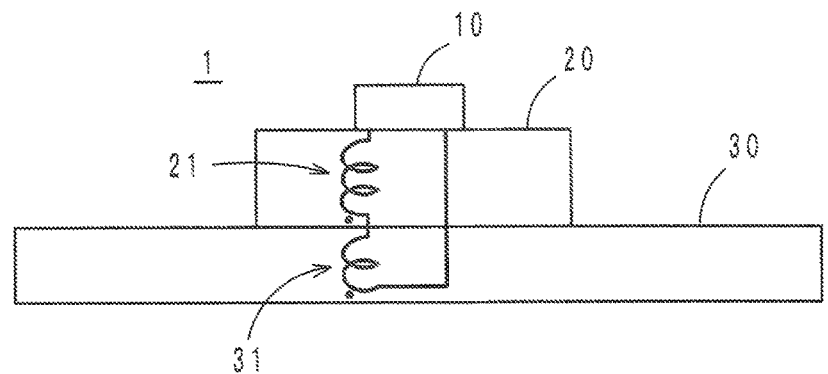
FIG. 2A is an equivalent circuit diagram of the wireless communication device of FIG. 1A.
Figure 2B:
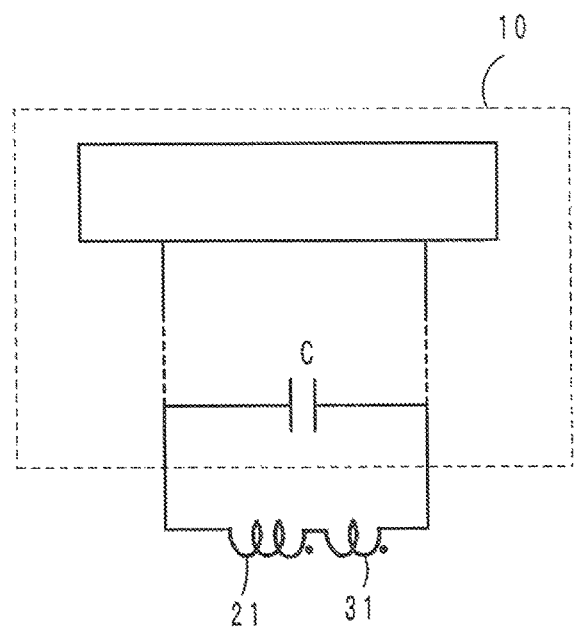
FIG. 2B is an equivalent circuit diagram of the wireless communication device of FIG. 1A.

In a resonance circuit including the wireless IC 10 and the first and second inductor patterns 31, 32, the capacitance C may be incorporated as a conductor pattern in the wireless IC 10 (see FIG. 2B). Alternatively, the capacitance C may be attached outside of the first substrate 20 as a chip component (not shown). When the capacitance C is incorporated in the wireless IC 10, the size of the wireless communication device 1 itself is reduced, and the conductor pattern can be microprocessed. Thus, the capacitance C with a small tolerance is provided. On the other hand, when the capacitance C is attached outside as a chip component, the capacitance C is readily changeable, and particularly, large capacitance is added.

The second inductor pattern 31 (32, 33) has a larger winding diameter than that of the first inductor pattern 21 (22a, 22b). Therefore, the second inductor pattern 31 defines and functions as a main radiating element.

Now, the first and second inductor patterns 21, 31 are described with reference to FIG. 3. The first substrate 20 is a rigid substrate which is formed preferably by sequentially stacking up a plurality of sheets 25a to 25e on which various conductors have been formed, and compression-bonding and baking the stacked sheets. The sheets 25a to 25e may be made of any of dielectric or magnetic material. For example, LTCC (Low Temperature Co-fired Ceramic) can be preferably used. Alternatively, ferrite may be used as the material. The various conductors are formed preferably by applying an electrically-conductive paste in a predetermined shape, in which various materials and manufacturing methods can be used. Note that conductors provided on the second substrate 30 which will be described in the following section can also be formed using the same material and the same manufacturing method.

The sheet 25a includes electrodes 26a to 26d provided on the upper surface and via-hole conductors 27a, 27b configured so as to penetrate to the lower surface. The sheet 25b includes a conductor pattern 23 provided on the upper surface and via-hole conductors 27a, 27c configured so as to penetrate to the lower surface. The number of sheets 25c, 25d prepared corresponds to a required number of turns (number of layers) of the first inductor pattern 21. On the upper surfaces of the sheets 25c, 25d, conductor patterns 22a, 22b are provided, and via-hole conductors 27c, 27d, 27e are configured so as to penetrate to the lower surfaces. The sheet 25e includes electrodes 24a, 24b provided on the lower surface, and via-hole conductors 27c, 27e configured so as to penetrate to the upper surface.

The second substrate 30 may be made of any of dielectric or magnetic material and is preferably a flexible substrate.

For example, a flexible film defined by a single polyimide resin layer is preferably used. On the upper surface of the second substrate 30, a conductor pattern 32 and an electrode 34 are provided, and via-hole conductors 36a, 36b are configured so as to penetrate to the lower surface. Opposite ends of the conductor pattern 32 are electrodes 32a, 32b. On the lower surface of the second substrate 30, a conductor pattern 33 is provided, and opposite ends of the conductor pattern 33 are electrodes 33a, 33b.

The first and second substrates 20, 30 are integrated by coupling the electrodes 24a, 24b provided on the lower surface of the first substrate 20 to the electrodes 32a, 34 provided on the upper surface of the second substrate 30 via solder or the like.

In the first substrate 20, by stacking up the sheets 25a to 25e, the conductor patterns 22a, 22b are coupled by the via-hole conductors 27d, 27e to define a coil such that the first inductor pattern 21 is provided. In the second substrate 30, the conductor patterns 32, 33 are coupled by the via-hole conductor 36b to define a coil such that the second inductor pattern 31 is provided.

In the first inductor pattern 21, one end of the conductor pattern 22a provided on the sheet 25c is coupled to the electrode 26a at the uppermost surface by the via-hole conductor 27a. The electrode 26a is coupled to one of the input/output terminals of the wireless IC 10 via solder or the like. The other end of the first inductor pattern 21 (one end of the conductor pattern 22b on the sheet 25d) is coupled to the electrode 24a provided on the lower surface of the sheet 25e by the via-hole conductor 27e. The electrode 24a is coupled to one end of the second inductor pattern 31 (the electrode 32a of the conductor pattern 32) via solder or the like. The other end of the second inductor pattern 31 (the electrode 33a of the conductor pattern 33) is coupled to the electrode 34 by the via-hole conductor 36a. The electrode 34 is coupled to the electrode 24b provided on the lower surface of the sheet 25e via solder or the like.

The electrode 24b is coupled to the conductor pattern 23 provided on the sheet 25b via the via-hole conductor 27c. The conductor pattern 23 is coupled to the electrode 26b at the uppermost surface via the via-hole conductor 27b. The electrode 26b is coupled to the other one of the input/output terminals of the wireless IC 10 through solder or the like. Note that the electrodes 26c, 26d on the sheet 25a are dummy electrodes which are provided to secure the wireless IC 10 onto the first substrate 20.

The first substrate 20 is mounted onto the second substrate 30, and furthermore, the wireless IC 10 is mounted onto the first substrate 20, such that a HF-band wireless communication device 1 including the equivalent circuit shown in FIG. 2A and FIG. 2B is provided. In the wireless communication device 1, the resonant frequency is determined by the first and second inductor patterns 21, 31 and the capacitance of the wireless IC 10. Therefore, a high frequency signal which is radiated from a reader/writer of the RFID system and received at the second inductor pattern 31 is supplied to the wireless IC 10 via the first inductor pattern 21, and the wireless IC 10 operates. On the other hand, a response signal from the wireless IC 10 is transmitted to the second inductor pattern 31 through the first inductor pattern 21 and radiated to the reader/writer.

In the wireless communication device 1, the first inductor pattern 21 that is coupled to the wireless IC 10 and the second inductor pattern 31 that defines and functions as a main radiating element are coupled in series, so that the power loss is small. In the resonant frequency of the wireless communication device 1, the L value of the first inductor pattern 21 is dominant so that the resonant frequency is stable. Further, since the second inductor pattern 31 has a large winding diameter, the communication distance is long.

The winding direction of the first inductor pattern 21 is a direction indicated by arrow x in FIG. 3. The winding direction of the second inductor pattern 31 is also a direction indicated by arrow x. That is, the magnetic fields of the first and second inductor patterns 21, 31 are coupled in phase to each other, and the sum of the L values (L1+L2) of the first and second inductor patterns 21, 31 (the L value of the pattern 21 (L1) preferably is about 1.32 µH, and the L value of the pattern 31 (L2) preferably is about 0.12 µH, for example) is the total L value. Note that the first and second inductor patterns 21, 31 may be coupled in opposite phase to each other. In this case, the total L value is L1−L2.

In the wireless communication device 1, the first substrate 20 that includes the first inductor pattern 21 that dominates the resonant frequency and the second substrate 30 that includes the second inductor pattern 31 that defines and functions as the main radiating element are preferably defined by separate substrates. Therefore, the wireless communication device 1 is configured to be manufactured inexpensively so as to have a small size and optimized electrical characteristics.

Particularly, since the first substrate 20 that includes the first inductor pattern 21 that dominates the resonant frequency is a rigid substrate, the resonant frequency is unlikely to vary and stable frequency characteristics are secured even when a bending stress acts on the device 1 or when another article is placed near the device 1. Further, since the second substrate 30 is a flexible substrate (resin film), the second substrate 30 is readily configured so as to have a relatively large size. Because of this advantage, the winding diameter of the second inductor pattern 31 is increased so that a radiation gain (long communication distance) is secured, and adhesion of the device 1 to various articles improves. Note that the first substrate 20 preferably has a size of approximately 1.7 mm×1.2 mm and a thickness of about 0.675 mm, and the second substrate 30 preferably has a size of approximately 2.8 mm×2.4 mm and a thickness of about 0.5 mm, for example.

In the wireless communication device 1, the L value (L1) of the first inductor pattern 21 preferably is greater than the L value (L2) of the second inductor pattern 31 by a predetermined difference or more, so that the L value of the first inductor pattern 21 (L1) is dominant in the L value of the entire wireless communication device 1, and the design flexibility of the second inductor pattern 31 improves. That is, the L value which is demanded of the resonance circuit is capable of being modified by the first inductor pattern 21, and therefore, the shape of the second inductor pattern 31 preferably is designed according to desired radiation characteristics without substantially restricting the L value.

Figure 4:
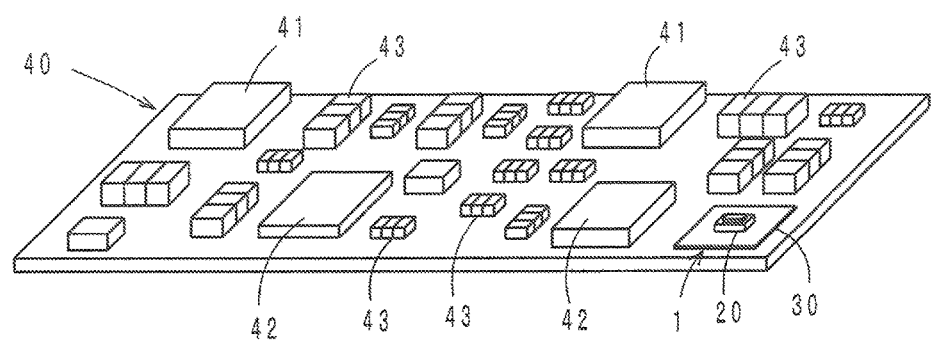
FIG. 4 is a perspective view showing a printed wiring board on which the wireless communication device of FIG. 1A is mounted.

FIG. 4 shows a printed wiring board 40 on which the wireless communication device 1 is mounted. The printed wiring board 40 preferably is to be incorporated in a mobile communication terminal, such as a cell phone, for example. The wireless communication device 1 preferably is mounted on a corner portion of the printed wiring board 40. Other elements, including switching modules 41, ICs 42, elements 43 such as chip resistors, chip capacitors, etc., are also mounted on the printed wiring board 40.

Mounting the wireless communication device 1 on the printed wiring board 40 enables step management in manufacture of the printed wiring board 40 with the utilization of wireless communication in the HF-band. Mounting the printed wiring board 40 that includes the wireless communication device 1 mounted thereon on a cell phone, or the like, enables using the device 1 for history management of the cell phone or the like. Besides the mobile communication terminals such as cell phones, adhering the wireless communication device 1 to clothing or ornamental products enables using the device 1 for stock management or authenticity determination of those articles. That is, the wireless communication device 1 is applicable for various uses.

The wireless communication device 1 can be adhered to not only a flat surface but also a curved surface of an article because the second substrate 30 is flexible. The adhesion is realized preferably by using a non-electrically conductive adhesive material, such as a double-sided tape, for example. When adhering the wireless communication device 1 to a metal surface, it is preferable to interpose a magnetic material, such as ferrite, between the metal surface and the device 1. Alternatively, it is preferable to remove a metal material from a location of adhesion.

Figure 5:
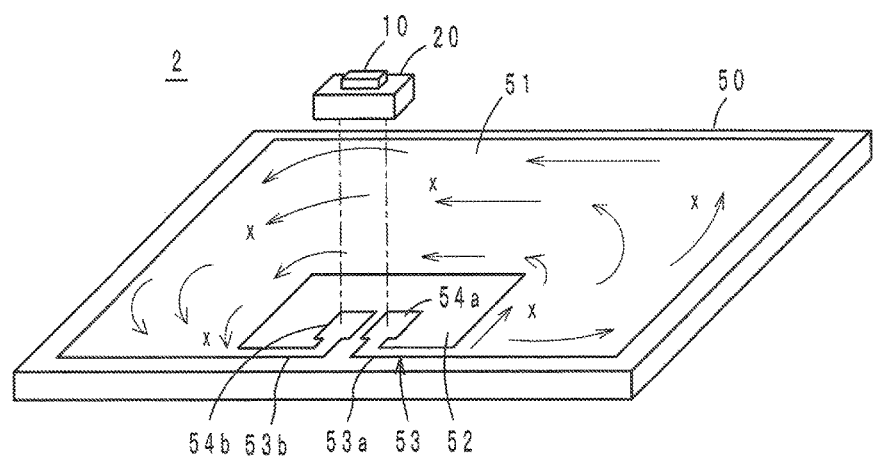
FIG. 5 is a perspective view showing a wireless communication device which is the second example.

In a wireless communication device 2 according to a second example of a preferred embodiment of the present invention, as shown in FIG. 5, the configuration of the wireless IC 10 and the first substrate 20 preferably is the same as that of the first example, although a second substrate 50 has a relatively large area, and a portion of a conductor pattern 51 that is provided on the second substrate 50 so as to have the same or substantially the same area as the second substrate 50 defines a second inductor pattern 53. The second inductor pattern 53 preferably is defined by a single layer, for example. The second substrate 50 may be either rigid or flexible.

Specifically, an opening 52 is provided in the conductor pattern 51, and inductor patterns 53a, 53b located in the opening 52 and the rim portion of the opening 52 define the second inductor pattern 53. End portions of the inductor patterns 53a, 53b define electrodes 54a, 54b. The electrodes 24a, 24b of the first substrate 20 (see FIG. 3) are coupled to the electrodes 54a, 54b via solder or the like.

In the second example, when communicating with a reader/writer, an electric current indicated by arrows x flows through the conductor pattern 51. A portion of the electric current mainly flowing along the rim portion of the opening 52 corresponds to the electric current flowing through the second inductor pattern 31 in the first example. The first inductor pattern 21 and the second inductor pattern 53 are coupled in phase to each other. Therefore, the operation and the functions and effects of the wireless communication device 2 are basically the same as those of the wireless communication device 1 that is the first example.

In the second example, the second substrate 50 may be realized by a printed wiring board incorporated in a mobile communication terminal such as a cell phone, and the conductor pattern 51 may be realized by a ground conductor provided in the printed wiring board. The conductor pattern 51 may be realized by a metal component other than the ground conductor, such as shield case, metal cover, battery cover, chassis, or the like.

A HF-band wireless communication device according to the present invention is not limited to the above-described examples of various preferred embodiments but can be variously modified within the scope of the spirit of the present invention.

For example, the first inductor pattern and the second inductor pattern are not necessarily coaxially wound around an identical axis. The winding axes of the first and second inductor patterns may not be identical. Further, the first inductor pattern and the second inductor pattern may be arranged so as not to overlap each other when viewed in plan so that the magnetic fields of the first and second inductor patterns are not coupled to each other. The specific numbers shown in the above examples for the L values of the inductors and the substrate size are merely exemplary.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A HF-band wireless communication device comprising:
a wireless IC configured to process a radio signal;
a first substrate including a first inductor pattern coupled to the wireless IC; and
a second substrate being a printed wiring board on which the first substrate is mounted; wherein
the second substrate includes a second inductor pattern including an opening;
an inductance value of the first inductor pattern is greater than an inductance value of the second inductor pattern, and the inductance value of the first inductor pattern is dominant in a resonant frequency of a resonance circuit including the first and second inductor patterns;
a winding diameter of the second inductor pattern is greater than a winding diameter of the first inductor pattern;
as seen in plan view of the opening of the second inductor pattern, at least a portion of the first substrate overlaps the opening of the second inductor pattern; and
the second inductor pattern is a ground conductor of the printed wiring board.

2. The HF-band wireless communication device according to claim 1, wherein the first substrate is a rigid substrate, and the second substrate is a flexible substrate.

3. The HF-band wireless communication device according to claim 1, wherein the first inductor pattern is defined by a coil.

4. The HF-band wireless communication device according to claim 1, wherein the inductance value of the first inductor pattern is about 1.32 µH, and the inductance value of the second inductor pattern is about 0.12 µH.

5. The HF-band wireless communication device according to claim 1, wherein the resonance circuit includes a capacitor defined by one of a conductor pattern in the wireless IC and a chip component attached outside of the first substrate.

6. The HF-band wireless communication device according to claim 1, wherein the first substrate and the second substrate are integrated by electrodes on the first substrate being coupled to electrodes on the second substrate.

7. The HF-band wireless communication device according to claim 5, wherein the conductor pattern has an area that is the same or substantially the same as an area of the second substrate.

8. The HF-band wireless communication device according to claim 1, wherein the second inductor pattern is defined by a single layer.

9. The HF-band wireless communication device according to claim 5, wherein the conductor pattern is a ground conductor.

10. The HF-band wireless communication device according to claim 5, wherein the conductor pattern is a metal component of one of a case, a cover, and a chassis.

11. The HF-band wireless communication device according to claim 1, wherein the first inductor pattern and the second inductor pattern are coaxially wound around an identical axis.

12. The HF-band wireless communication device according to claim 1, wherein a winding axis of the first inductor pattern is different from a winding axis of the second inductor pattern.

13. The HF-band wireless communication device according to claim 1, wherein the first inductor pattern and the second inductor pattern do not overlap each other as seen in a plan view.

14. A communication terminal comprising the HF-band wireless communication device according to claim 1.

15. The communication terminal according to claim 14, wherein the communication terminal is a cell phone.

16. The communication terminal according to claim 14, further comprising a printed wiring board on which the HF-band wireless communication device is mounted.

17. The communication terminal according to claim 16, wherein the HF-band wireless communication device is mounted on a corner of the printed wiring board.

* * * * *